United States Patent
Pang et al.

(10) Patent No.: US 7,568,614 B2
(45) Date of Patent: Aug. 4, 2009

(54) DRIVER INTERFACE FOR DATA CAPTURE SYSTEMS

(75) Inventors: Robert James Pang, Williston Park, NY (US); Kenneth S. Bhella, Stony Brook, NY (US); Harindra Wajirappriya, Keleniya (LK); Kaminda Dimunge, Rajagiriya (LK); Rohan Dehigaspitiyage, Nugegoda (LK)

(73) Assignee: Symbol Technologies, Holtsville, NY (US)

( * ) Notice: Subject to any disclaimer, the term of this patent is extended or adjusted under 35 U.S.C. 154(b) by 24 days.

(21) Appl. No.: 11/731,394

(22) Filed: Mar. 30, 2007

(65) Prior Publication Data
US 2007/0241185 A1    Oct. 18, 2007

Related U.S. Application Data

(60) Provisional application No. 60/788,959, filed on Apr. 4, 2006.

(51) Int. Cl.
*G06F 17/00* (2006.01)
*G06K 7/10* (2006.01)

(52) U.S. Cl. .................................. 235/375; 235/472.01

(58) Field of Classification Search ................. 235/375, 235/383, 382, 472.01, 381, 462.01, 472.02, 235/472.03, 492, 486
See application file for complete search history.

(56) References Cited

U.S. PATENT DOCUMENTS

| | | | | | |
|---|---|---|---|---|---|
| 4,866,257 | A | * | 9/1989 | Elliott et al. | 235/462.15 |
| 4,951,245 | A | * | 8/1990 | Bailey et al. | 710/8 |
| 5,157,687 | A | * | 10/1992 | Tymes | 375/140 |
| 6,094,689 | A | * | 7/2000 | Embry et al. | 710/5 |
| 6,347,341 | B1 | * | 2/2002 | Glassen et al. | 709/250 |
| 6,507,864 | B1 | * | 1/2003 | Klein et al. | 709/201 |
| 6,959,865 | B2 | * | 11/2005 | Walczyk et al. | 235/454 |
| 7,387,253 | B1 | * | 6/2008 | Parker et al. | 235/462.45 |
| 2007/0044092 | A1 | * | 2/2007 | Banerjee | 717/176 |
| 2007/0126554 | A1 | * | 6/2007 | Choi et al. | 340/10.1 |
| 2007/0241185 | A1 | * | 10/2007 | Pang et al. | 235/380 |

* cited by examiner

*Primary Examiner*—Thien M Le

(57) ABSTRACT

An interface enables data capture systems, such as electro-optical readers, RFID readers, and imagers operative for capturing transaction data to communicate with a plurality of open applications executed by a host computer. A queue arranges the transaction data processed by one of the open applications, and management data processed by another of the open applications. A queue handler transmits the processed transaction data and the processed management data from the queue to each data capture system without closing any of the open applications.

25 Claims, 3 Drawing Sheets

DRIVER INTERFACE FOR DATA CAPTURE SYSTEMS

CROSS REFERENCE TO RELATED APPLICATION

This application claims the priority of U.S. Provisional Application Ser. No. 60/788,959, filed Apr. 4, 2006.

BACKGROUND OF THE INVENTION

1. Field of the Invention

The present invention generally relates to in-field remote management of data capture systems, such as electro-optical readers, preferably laser scanners for reading indicia, such as bar code symbols, as well as imagers for capturing an image of such indicia or other targets, as well as radio frequency identification (RFID) devices for identifying targets and, more particularly, to an interface that allows one or more applications to communicate with one or more data capture systems without having to close any application to allow another application to proceed.

2. Description of the Related Art

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector that detects light along the scan line that is reflected or scattered from the symbol. The photodetector or sensor is positioned such that it has a field of view that ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Both one- and two-dimensional symbols can be read by employing moving-beam scanners, as well as solid-state imagers. For example, an image sensor device may be employed which has a one- or two-dimensional array of cells or photosensors that correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to use radio waves to automatically identify objects, people, or like targets. An RFID tag or transponder identifies a target. An RFID reader interrogates the tag and converts radio waves reflected back from the tag into digital data.

As satisfactory as such moving-beam scanners, imagers and RFID devices are in capturing data, such data capture systems are not easily updated in the field. Typically, a portable data capture system is connected, and movable relative, to a transaction terminal operative for processing the transaction data captured by the system. It is up to a human user to disconnect the system and initiate the process of connecting the system to a dedicated configuration computer operative for upgrading the system. Alternatively, the user can upgrade each system by scanning parameter bar code symbols which self-configure each system. Such upgrading, however, can lead to costly disruptions due to the system being out of service. In some applications, there is a multitude of systems that are operatively connected to a single transaction terminal. Disconnecting and upgrading each system, in turn, is a laborious procedure. Frequently, many systems are simply not upgraded due to the great effort involved.

In addition, many data capture systems do not have status or error reporting capabilities. When operating problems arise in such systems, much time and effort are required to report the problem, diagnose the problem, and service the problem. It is up to the human user to detect the problem and initiate the process of reporting the failure. This also leads to costly disruptions due to the system being out of service. Servicing generally requires the system to be disassembled for repair. Sometimes, the user has insufficient expertise to recognize the onset of a system problem and delays reporting until a complete system failure has occurred.

Management applications to update, and/or report status and errors for, data capture systems can be incorporated into the application that processes the captured data, but this is not preferred since it is undesirable to modify the data processing application. A separate management application can be provided that opens and performs management functions when the data processing application is not active; however, this consumes time since it requires one of the applications to close to allow the other application to proceed. Also, a user may not wish to wait for the management application to finish, but may wish to immediately capture data, or vice versa. Thus, the known data capture system, which is an exclusive, single use device, cannot communicate with a plurality of open applications.

SUMMARY OF THE INVENTION

One feature of the present invention resides, briefly stated, in an interface for enabling at least one data capture system, and preferably a plurality of data capture systems, each operative for capturing transaction data, to communicate with a plurality of open applications executed by a host computer. Each data capture system may be an electro-optical reader for reading indicia, such as one- or two-dimensional bar code symbols, or an imager for imaging a target that can be any person, place, or thing, or a radio frequency identification (RFID) reader for interrogating a target with radio waves. The host computer may be a transaction terminal, for example, a point of sale workstation or a cash register, which is connected to each data capture system via a wireless or wired link. In the preferred embodiment, the data capture systems are handheld devices that are operable and transportable by hand from one place to another.

The open applications include a point of sale application for processing the captured transaction data, for example, by retrieving a price from a look-up table for a product identified by the transaction data, and a management application for processing management data that upgrades the data capture systems or that identifies, monitors and downloads parameters of various operational functions of the data capture systems for status and error reporting and/or for corrective action.

In accordance with one feature of this invention, the interface includes a queue for arranging the transaction data processed by one of the open applications, e.g., the point of sale application, and the management data processed by another of the open applications, e.g., the management application. A queue handler is operative for transmitting the processed transaction data and the processed management data from the queue to a respective data capture system without closing any of the open applications. Preferably, the queue handler is operative for managing the queue to prioritize the processed transaction data and the processed management data or the queue is managed in a first-in/first-out manner depending on the needs of the application.

In accordance with another feature of this invention, the interface includes a device handler for identifying each of a plurality of the data capture systems, and a device list in which all of the identified data capture systems are listed. The device handler is operative for managing the device list to route the processed transaction data and the processed management data to an identified data capture system.

Still further, a data capture handler is provided for routing the captured transaction data to at least one of the open applications, and a Windows Management Instrumentation (WMI) plug-in is also provided for enabling at least one data capture system to communicate with an application executed by a Windows operating system. This invention is not intended to be limited to the Windows operating system, but could run on other operating systems such as Linux, Unix, or Mac.

Yet an additional feature of this invention resides in employing the interface in an arrangement for, and a method of, communicating the data capture systems with the host computer by uploading and/or downloading management data through the interface to the data capture systems without affecting transaction data capture. The data capture systems are upgraded by the management application, preferably directly from the host computer or remotely therefrom and not, as in the prior art, by reading special self-configuring parameter symbols, or by being disconnected from the terminal (i.e., taken off-line), then connected to a different dedicated configuration computer remote from the terminal for the upgrade, and then reconnected to the terminal.

Hence, the data capture systems are remotely upgraded by an open management application, and data captured by the data capture systems are remotely processed by an open point of sale application. Neither open application is closed. There is no downtime associated with waiting for one application to close before the other is opened. The interface keeps both applications open for prompt management and data processing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
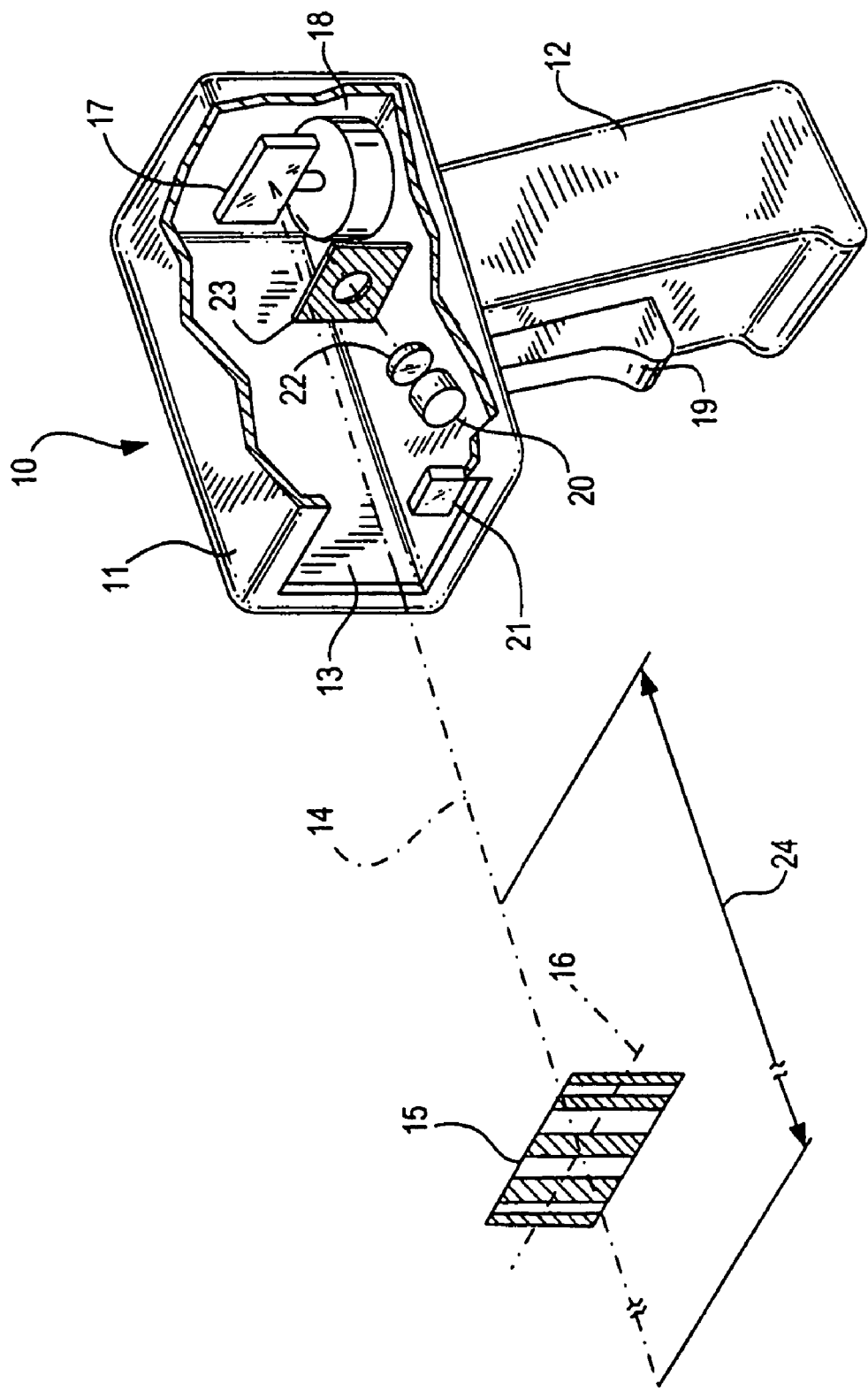
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia that may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. The barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20 mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a convex portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light.

A digitizer typically converts the analog signal into a pulse width modulated digital signal, with the pulse widths and/or spacings corresponding to the physical widths of the bars and spaces of the scanned symbol 15. A decoder, typically comprising a programmed microprocessor with associated random access memory (RAM) and read only memory (ROM), decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size that extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules. A display 25 is typically mounted on the housing 1'1 to display information related to the indicia being read.

Figure 2:
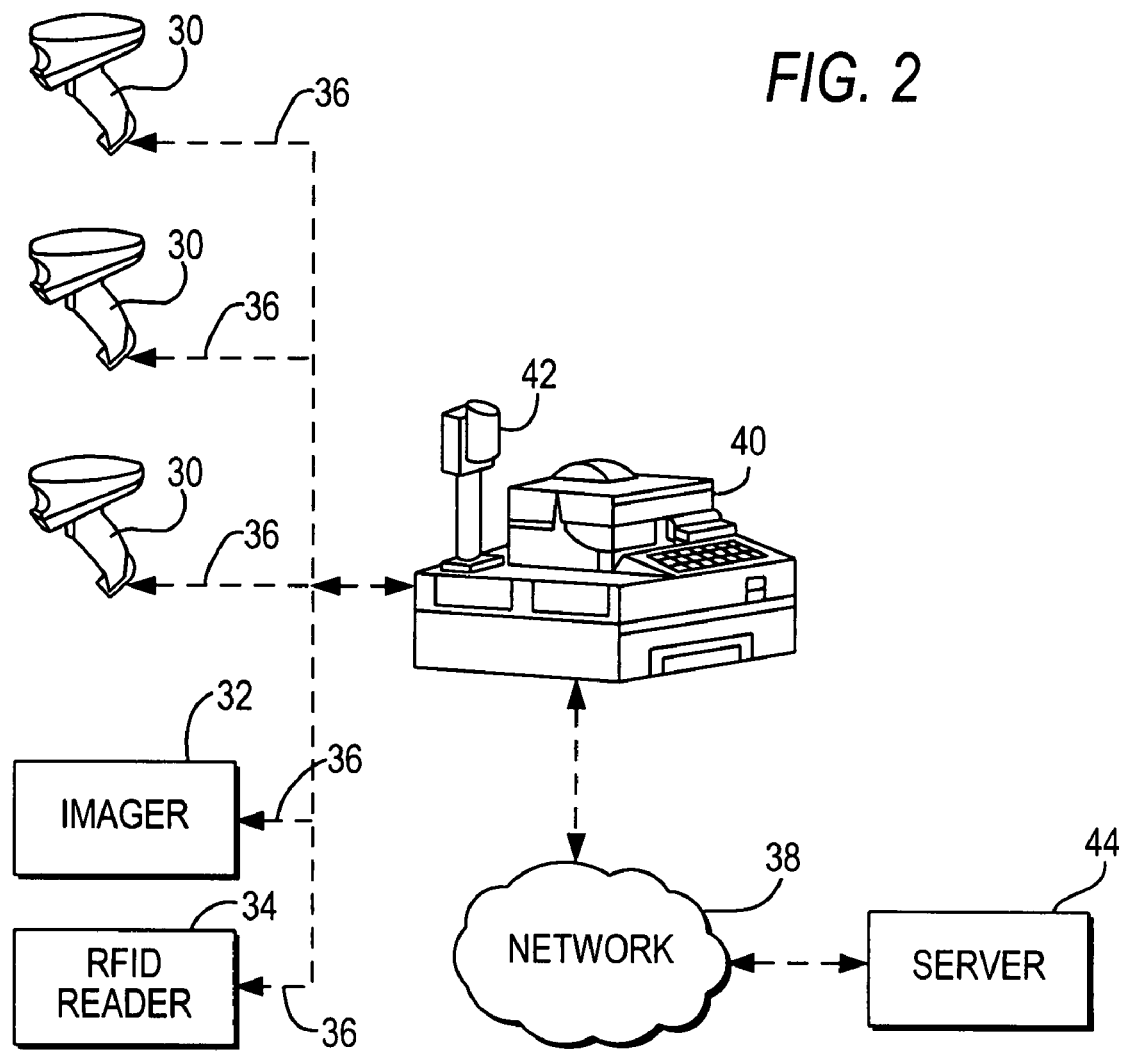
FIG. 2 is a circuit schematic depicting an in-field communications arrangement in accordance with the present invention for enabling communication between data capture systems, one of which advantageously being the reader of FIG. 1, and a host computer.

As described so far, the handheld scanner device 10 is a data capture system for capturing transaction data indicative of the symbol 15. FIG. 2 depicts an architecture for in-field managing of at least one data capture system, and preferably a multitude of such data capture systems, such as handheld laser scanner devices 30, essentially identical to device 10, imaging reader 32 for capturing an image of the symbol or a target prior to processing the image into the transaction data, and an RFID reader 34 for interrogating an RFID tag or transponder to obtain the transaction data. The illustrated number and type of data capture system in FIG. 2 is merely exemplary, since more or less than the illustrated systems can, and often is, employed in a real-world application. Other data capture systems contemplated by this invention include card readers, such as magnetic stripe readers and smart card readers, and devices having a screen for capturing a signature, a fingerprint, or a human touch.

Each of these systems has a hard-wired connection or preferably a wireless connection 36 to one or more access points or nodes of a network 38. One of the nodes is depicted as a host computer or transaction terminal 40, preferably constituted, as shown, as a cash register in a supermarket environment. However, it will be understood that the terminal is not to be restricted to a cash register and that any host computer, such as a laptop computer or a desktop computer, will do. Also, the terminal need not be stationary and can be mobile. The term "terminal" is to be interpreted in its broadest sense as any device having intelligence. The terminal 40 may have a cradle 42 for supporting the system. Each system 30, 32, 34 preferably has a wireless transceiver for communication over a wireless interface, such as wide area network (WAN), local area network (LAN), or personal area network (PAN), such as Bluetooth™. A plurality of transaction terminals 40 is often configured in the network 38. Each system is preferably handheld, portable and movable relative to the terminal to which it is operatively connected by a wired or a wireless connection.

Each transaction terminal 40 is operative for executing a point of sale (POS) application 48 loaded on the terminal 40 and operative for processing the transaction data captured by a respective system 30. This typically involves retrieving information, for example, prices, from a look-up table (LUT) on the network 38, or retrieving inventory information, with the aid of a LUT server. Each transaction terminal is also operative for executing a management program 50, for processing management data from the terminal to one, some, or all the data capture systems. From time to time, the firmware on each system is updated for enhanced system operation. The POS application 48 and the management application 50 may also be loaded on a remote server 44, for example, a computer, away from the terminal 40 that is operatively connected over the network 38 to all the terminals 40 and their associated data capture systems. The server 44 initiates an upload over the network 38 to the transaction terminal 40 which, in turn, communicates the update data to the systems. If the terminal permits, the upload can be initiated from the terminal itself.

Also, monitoring data generated by each system itself and indicative of various operating conditions being monitored, such as the identification, health and statistics of the system, is downloaded from one or more of the systems to one or more of the terminals over the network 38 to the server 44. Any one of the systems 30, 32, 34, the terminal 40 or the server 44 may initiate the download. Corrective action by the server is uploaded to the system being monitored.

The uploading and downloading of management data and the processing of transaction data in the architecture of FIG.

2 is based on software, namely an interface 50 constituted as middleware software running on each terminal 40, or on the server 44. The middleware, once installed, is completely transparent to the data capture and management operations, as well as to any user of the systems. Each system captures transaction data and sends the transaction data, together with any management data, to the middleware 50. The middleware 50 is operative to parse the incoming data and to send the transaction data to the transaction data processing application 48 responsible for decoding the captured data and retrieving information, and to send the management data to the management application 68 for forwarding to the server 44. The server 44 aggregates and manages the management data for all the systems within an enterprise.

Figure 3:
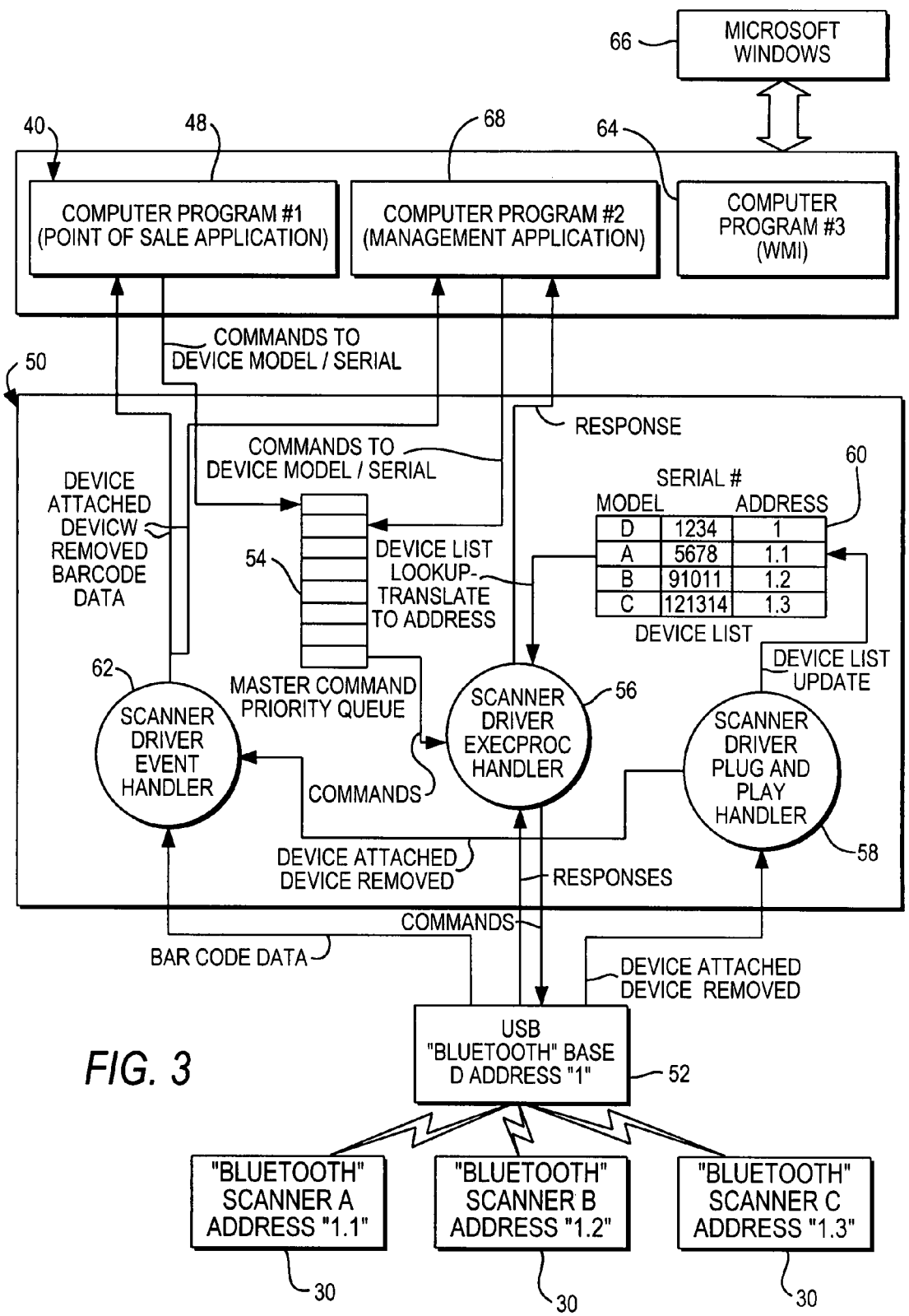
FIG. 3 is a flow chart schematic depicting an interface for enabling the in-field data capture systems to communicate with open applications executed by the host computer in accordance with the present invention.

FIG. 3 depicts an architecture in which the middleware or interface 50 is located between a plurality of systems and the terminal 40. Each system has its own serial number, model number and address and is connected, preferably by a wireless Bluetooth™ connection or a wired connection such as a Universal Series Bus (USB) connection, to a router 52 that has its own serial number, model number and address.

The interface 50 is operative for enabling at least one, and preferably all, of the data capture systems to communicate with a plurality of open applications 48, 68 executed by the host computer 40. The interface includes a queue 54 for arranging the transaction data processed by the open POS application 48, and management data processed by the open management application 68; and a queue handler 56 for transmitting the processed transaction data and the processed management data from the queue 54 to the at least one data capture system without closing any of the open applications 48, 68. Preferably, the queue handler 56 is operative for managing the queue 54 to prioritize the processed transaction data and the processed management data if configured that way. If the priorities of all the applications are the same, then the queue is managed in a first-in/first-out (FIFO) manner.

The interface also includes a device handler 58 for identifying and registering each of a plurality of the data capture systems, and a device list 60 in which all of the identified data capture systems are listed and registered with their individual serial numbers, model numbers and addresses. The device handler 58 is operative for managing the device list 60 to route the processed transaction data and the processed management data to an identified data capture system.

The interface additionally includes a data capture handler 62 for routing the captured transaction data to at least one of the open applications 48, 68 and a Windows Management Instrumentation (WMI) plug-in 64 for enabling at least one data capture system to communicate with an application executed by a Windows operating system 66. For other operating systems, the plug-in 64 is modified for compatibility.

In operation, one of the applications 48, 68, 64 opens and searches via the interface 50 for a connected data capture system. The interface opens and allocates resources to the open application. The open application waits to receive inbound events, such as incoming transaction data, or management data, or the connection or removal of a data capture system. When the interface finds a connected system, the device handler 58 queries the model number, serial number and address of the system. These system particulars are registered and stored in the device list 60. The queue handler 56 is operatively connected to the device list 60 and manages the queue 54. The first open application is assigned an available queue location, and the next application to be opened is assigned another available queue location. These availabilities may change over time, but typically, the processed transaction data and the processed management data are prioritized in accordance with the needs of the applications, or, if the priorities are the same or have not been set, then the queue is managed in a first-in/first-out manner. The processed transaction data and the processed management data are directed to the system identified by the device handler 58. The data capture handler 62 is operative for routing the captured transaction data to at least one of the open applications 48, 68. The Windows Management Instrumentation (WMI) plug-in 64 is still another open application accessed through the interface 50 and operative for enabling at least one data capture system to communicate with an application executed by a Windows operating system 66. The Windows application 64 advantageously places a marker or icon on the display 25 of a data capture system which, when activated, launches the application or a function therein. Typically, the application 64 registers management data.

The arrangement of this invention separates the management data and the transaction data so that each is separately routed and processed. Although it is preferred that the middleware 50 be resident on the terminal 40, it could also be loaded on each system, or be distributed on both the terminal and the system. All communication is bi-directional. Hence, the monitoring of various operational parameters of the system, for example, the number of successful or unsuccessful data captures, or the status of various components of the system, is downloaded from the system and, in response, corrective action is uploaded to the system. Management data, such as system upgrades for enhanced operation, is uploaded from the server or the terminal, and verification of the successful complete upload is downloaded to the server. The processing of the management data does not interfere with the processing of the transaction data.

It will be understood that each of the elements described above, or two or more together, also may find a useful application in other types of constructions differing from the types described above.

While the invention has been illustrated and described as embodied in in-field monitoring and management of data capture systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An interface for enabling a plurality of data capture systems, each operative for capturing transaction data, to respectively communicate with a plurality of open applications executed by a host computer, comprising:

a queue for arranging the transaction data processed by one of the open applications, and management data processed by another of the open applications;

a device list for listing all the data capture systems;

a device handler for managing the device list and identifying the data capture system to which the processed transaction data and the processed management data are to be transmitted; and a queue handler for transmitting the processed transaction data and the processed management data from the queue to the identified data capture system without closing any of the open applications.

2. The interface of claim 1, wherein the queue handler is operative for managing the queue to prioritize the processed transaction data and the processed management data.

3. The interface of claim 2, wherein the processed transaction data and the processed management data are prioritized in a first-in/first-out manner.

4. The interface of claim 1, and a data capture handler for routing the captured transaction data to at least one of the open applications.

5. The interface of claim 1, and a Windows Management Instrumentation (WMJ) plug-in for enabling at least one of the data capture systems to communicate with an application executed by a Windows operating system.

6. A communications arrangement, comprising:
 a host computer for executing a plurality of open applications;
 a plurality of data capture systems each operative for capturing transaction data and movable relative to the host computer; and
 an interface for enabling each data capture system to respectively communicate with the plurality of open applications, the interface including a queue for arranging the transaction data processed by one of the open applications, and management data processed by another of the open applications, a device list for listing all the data capture systems, a device handler for managing the device list and identifying the data capture system to which the processed transaction data and the processed management data are to be transmitted, and a queue handler for transmitting the processed transaction data and the processed management data from the queue to the identified data capture system without closing any of the open applications.

7. The arrangement of claim 6, wherein the host computer is a transaction terminal, and wherein at least one of the data capture systems is an electro optical reader for reading indicia.

8. The arrangement of claim 7, wherein the reader is operatively connected to the transaction terminal via the interface by one of a wired and a wireless link.

9. The arrangement of claim 7, wherein the reader is one of a laser scanner for scanning the indicia with a laser beam, and an imager for capturing an image of the indicia.

10. The arrangement of claim 7, wherein the at least one data capture system is a handheld device movable relative to the terminal.

11. The arrangement of claim 6, wherein at least one of the data capture systems is a radio frequency identification (RFID) device.

12. The arrangement of claim 6, wherein the queue handler is operative for managing the queue to prioritize the processed transaction data and the processed management data.

13. The arrangement of claim 12, wherein the processed transaction data and the processed management data are prioritized in a first-in/first-out manner.

14. The arrangement of claim 6, wherein the interface includes a data capture handler for routing the captured transaction data to at least one of the open applications.

15. The arrangement of claim 6, wherein the interface includes a Windows Management Instrumentation (WMI) plug-in for enabling at least one of the data capture systems to communicate with an application executed by a Windows operating system.

16. A method of enabling a plurality of data capture systems each operative for capturing transaction data to respectively communicate with a plurality of open applications executed by a host computer, comprising the steps of:
 arranging the transaction data processed by one of the open applications, and management data processed by another of the open applications, in a queue;
 listing all the data capture systems in a device list;
 managing the device list and identifying the data capture system to which the processed transaction data and the processed management data are to be transmitted; and
 transmitting the processed transaction data and the processed management data from the queue to the identified data capture system without closing any of the open applications.

17. The method of claim 16, and the step of managing the queue to prioritize the processed transaction data and the processed management data.

18. The method of claim 17, and the step of prioritizing the processed transaction data and the processed management data in a first-in/first-out manner.

19. The method of claim 16, and the step of routing the captured transaction data to at least one of the open applications.

20. The method of claim 16, and the step of enabling at least one of the data capture systems to communicate with an application executed by a Windows operating system.

21. A communications method, comprising the steps of:
 executing a plurality of open applications;
 capturing transaction data with a plurality of movable data capture systems; and
 enabling each data capture system to respectively communicate with the plurality of open applications, including the steps of arranging the transaction data processed by one of the open applications, and management data processed by another of the open applications, in a queue, listing all the data capture systems in a device list, managing the device list and identifying the data capture system to which the processed transaction data and the processed management data are to be transmitted, and transmitting the processed transaction data and the processed management data from the queue to the identified data capture system without closing any of the open applications.

22. The method of claim 21, and the step of managing the queue to prioritize the processed transaction data and the processed management data.

23. The method of claim 22, and the step of prioritizing the processed transaction data and the processed management data in a first-in/first-out manner.

24. The method of claim 21, and the step of routing the captured transaction data to at least one of the open applications.

25. The method of claim 21, and the step of enabling at least one of the data capture Systems to communicate with an application executed by a Windows operating system.

* * * * *

UNITED STATES PATENT AND TRADEMARK OFFICE
CERTIFICATE OF CORRECTION

PATENT NO. : 7,568,614 B2  Page 1 of 1
APPLICATION NO. : 11/731394
DATED : August 4, 2009
INVENTOR(S) : Pang et al.

It is certified that error appears in the above-identified patent and that said Letters Patent is hereby corrected as shown below:

ON THE FACE PAGE

On the Face Page, in Field (73), under "Assignee", in Column 1, Line 1, delete "Symbol Technologies," and insert -- Symbol Technologies, Inc., --, therefor.

IN THE DRAWINGS

In Fig. 3, Sheet 3 of 3, for Tag "50", Line 3, delete "DEVICW" and insert -- DEVICE --, therefor.

IN THE CLAIMS

In Column 9, Line 15, in Claim 5, delete "(WMJ)" and insert -- (WMI) --, therefor.

In Column 10, Line 60, in Claim 25, delete "Systems" and insert -- systems --, therefor.

Signed and Sealed this

Eighth Day of June, 2010

David J. Kappos
*Director of the United States Patent and Trademark Office*